D. E. TEAL.

Revolving and Tilting Chairs.

No. 5,345. Reissued April 1, 1873.

Witnesses:
H. C. Wattenberg.
W. Lovell

Inventor:
Daniel E. Teal
per G. W. Gaston
Atty

AM. PHOTO-LITHOGRAPHIC CO. N.Y. (OSBORNE'S PROCESS)

UNITED STATES PATENT OFFICE.

DANIEL E. TEAL, OF NEW LISBON, NEW YORK, ASSIGNOR TO HEYWOOD BROTHERS & COMPANY.

IMPROVEMENT IN REVOLVING AND TILTING CHAIRS.

Specification forming part of Letters Patent No. 105,516, dated July 19, 1870; reissue No. 5,055, dated September 10, 1872; reissue No. 5,345, dated April 1, 1873; application filed March 27, 1873.

*To all whom it may concern:*

Be it known that I, DANIEL E. TEAL, of New Lisbon, in the county of Otsego and State of New York, have invented certain new and useful Improvements in Chairs; and I do hereby declare that the following is a full, clear, and exact description thereof, reference being had to the accompanying drawing and to the letters of reference marked thereon, making a part of this specification, in which—

Figure 1:
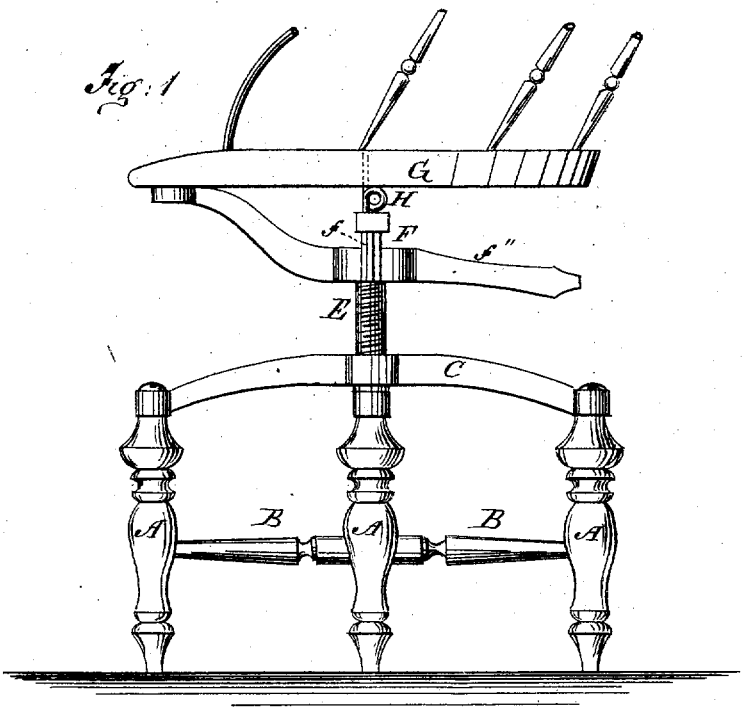
Figure 2:
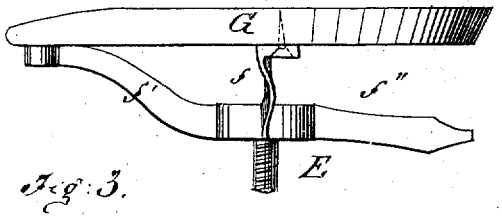
Figure 3:
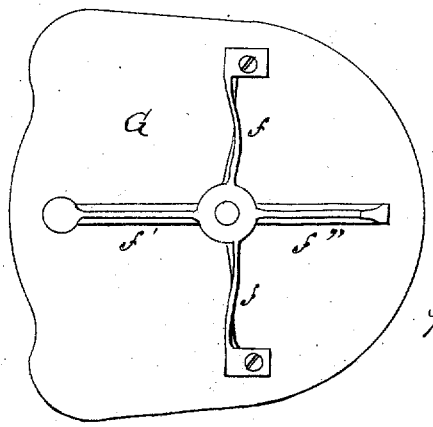

Figure 1 is a side elevation of a swivel-chair, containing my improvements. Fig. 2 is a like view of a chair-seat, showing another means for connecting it to the screw; and Fig. 3 is a plan view of the lower side of same.

Letters of like name and kind refer to like parts in each of the figures.

My invention is an improvement in swivel-chairs; and it consists, principally, in the spider secured to or upon the upper end of the supporting screw or swivel and upon the lower side of the seat, the side arms of which are caused to act as pivotal springs for said seat, as hereinafter shown. It also consists in the means employed for connecting together the upper ends of the legs of the stool, and furnishing a support for the nut containing the swivel-screw by means of a metal spider, whereby the legs are strongly connected together at their upper ends.

In the annexed drawing, A and A represent the legs of the stool, connected together near their centers lengthwise by means of transverse intersecting rounds B, and at their upper ends by means of a metal spider, C, which consists of four arms, secured at their inner ends to a nut prepared for the reception of the pivotal screw, and from thence extending radially outward, and provided at their outer ends with a socket, for the reception of the upper ends of said legs, the latter of which are secured within said sockets by means of screws passing into the wood. Secured to or upon the upper end of the screw E is a metal spider, F, having four arms, which extend radially outward from the center to or near the outer edge of the seat G. The side arms *f* extend slightly upward from the center, and are connected to the seat by means of a spiral spring, H, the opposite ends of which are secured within said seat and the outer ends of said arm, so as to form a pivotal joint between said seat and the spider. The front arm *f'* extends upward so as to bear against and support the front edge of the seat when the latter is in a horizontal position, while the height of the rear arm *f''* is so adjusted as to permit said stool to be tilted or rocked to the rear as far as safety will permit, when it rests upon and is supported by means of the rear end of said arm.

In Fig. 2 is shown a modification of the spider, in which the side arms *f* are formed of spring-steel, and have a sufficient depth to enable them to support the required weight, while their thickness is such as to give them the necessary twisting or lateral spring. As thus constructed, said arms are secured at their outer ends directly to or upon the bottom of the seat, and serve not only as a support therefor, but also as a pivotal joint between the same and the spider.

Having thus fully set forth the nature and merits of my invention, what I claim as new is—

1. A swivel-chair, in combination with a tilting seat, when the interposing springs are secured to a metallic spider and to the chair-seat, as described.

2. The supporting-spider F, constructed as described, with side spring-arms *f*, and connected to the screw E and seat G, substantially as and for the purpose shown.

3. A spider with a central nut, said spider provided with sockets for connecting together, and in combination with the legs of a chair or stool, substantially for the purpose described.

DANIEL E. TEAL.

Witnesses:
JAS. E. COOKE,
A. G. MOORE.